United States Patent [19]

Inoue

[11] Patent Number: 5,202,838
[45] Date of Patent: Apr. 13, 1993

[54] NON-CONTACT IC CARD

[75] Inventor: Takesi Inoue, Itami, Japan

[73] Assignee: Mitsubishi Denki Kabushiki Kaisha, Tokyo, Japan

[21] Appl. No.: 686,435

[22] Filed: Apr. 17, 1991

[30] Foreign Application Priority Data

Apr. 19, 1990 [JP] Japan .................................. 2-101705
Sep. 14, 1990 [JP] Japan .................................. 2-242604

[51] Int. Cl.$^5$ ............................................. G06F 15/20
[52] U.S. Cl. ..................................... 364/480; 364/550; 340/870.31
[58] Field of Search .................... 340/870.31; 364/480, 364/550

[56] References Cited

U.S. PATENT DOCUMENTS

4,608,550  8/1986  Umebayashi et al. ...... 340/870.31 X
4,797,541  1/1989  Billings et al. ...................... 235/449

*Primary Examiner*—Edward R. Cosimano
*Attorney, Agent, or Firm*—Leydig, Voit & Mayer

[57] ABSTRACT

A non-contact IC card for receiving electrical power from and exchanging signals with a terminal device without contact has a power consuming circuit which consumes electrical power when the electrical power consumption in the IC card is small. The rate of power consumption by the power consuming circuit is controllable in accordance with the state of the IC card, such as a stand-by state, receiving state, transmitting state, and signal processing state. The power consuming circuit includes a series connection of a switching element and a resistor connected between high-voltage and grounding terminals. The state of the switching element is sequentially controlled by a microcomputer. The control of the power consumption is attained by selecting one of a plurality of the power consuming circuits having different resistance values.

8 Claims, 7 Drawing Sheets

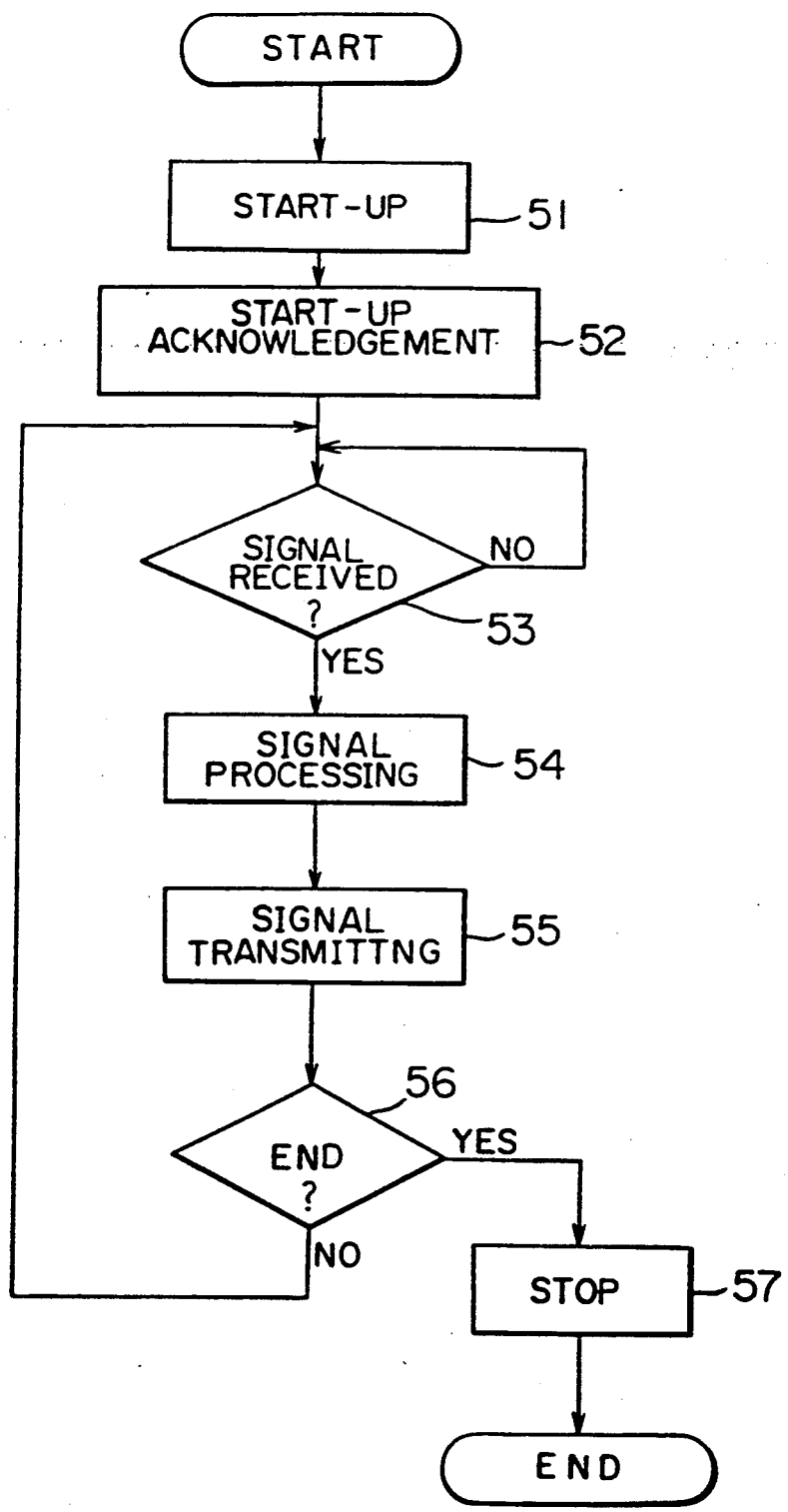

NON-CONTACT IC CARD

BACKGROUND OF THE INVENTION

1. Field of the Invention

The present invention relates to a portable IC card, referred to here as a carrier, of the non-contact type and, more particularly, to a non-contact portable carrier which is supplied with power through an electromagnetic coupling.

2. Description of the Related Art

FIG. 6 shows the construction of a known non-contact portable carrier of electromagnetic coupling type. The non-contact portable carrier 9 has a power receiving coil 10 to which is connected a full-wave rectifier circuit 11. A smoothing capacitor 12 and an integrated circuit 13 (referred to as "IC" hereinafter) for controlling and processing signals are connected to the full-wave rectifier circuit 11. The smoothing capacitor 12 has a high-voltage terminal and a grounding terminal. A signal transmitting/receiving coil 14 is connected to the IC 13 through a received signal detecting element 15 and a signal transmitting element 16.

The portable carrier 9 thus constructed is set on a terminal device 1. The terminal device 1 has a power supplying coil 2 and a signal transmitting/receiving coil 6 which are disposed adjacent the coils 10 and 14 of the portable carrier 9 set on the device 1. A power source 3 and a voltage regulator 5 are connected to the power supplying coil 2. A voltage detector 4 for detecting the voltage across the coil 2 is also connected to the power supplying coil 2. The output of the voltage detector 4 is connected to the power voltage regulator 5. A signal generator 7 and a received signal detecting element 8 are connected to the signal transmitting/receiving coil 6.

The operation of the conventional non-contact portable carrier 9 will be described with specific reference to a flow chart shown in FIG. 7. As the non-contact portable carrier 9 is set on the terminal device 1, the power receiving coil 10 of the portable carrier 9 is brought close to the power supplying coil 12 of the terminal device 1. As a consequence, AC voltage is supplied from the power source 3 to the portable carrier 9 through the power supplying coil 2. This AC voltage is rectified into a DC voltage through the full-wave rectifier circuit 11 and the capacitor 12 and the DC voltage is supplied to the IC 13, whereby the portable carrier 9 is started in Step 51 of the flow.

In Step 52, the IC 13 of the portable carrier 9 turns the signal transmitting element 16 on and off, thus delivering to the terminal device 1 a start-up acknowledgment signal indicative of the start-up of the portable carrier 9, through the signal transmitting/receiving coil 14.

Upon detection of the start-up acknowledgment signal through the signal transmitting/receiving coil 6 and the received signal detecting element 8, the terminal device 1 drives the signal generator 7 as needed to transmit, through the coil 6, a signal indicative of the content of the processing and data.

In Step 53, the portable carrier 9 waits until it receives a signal from the terminal device 1 through the coil 14 and the received signal detecting element 15. Until the signal is received, the output of Step 53 is "no" and Step 53 is repeated. Upon receipt of this signal, the output of Step 53 is "yes" and the process proceeds to Step 54 in which the the portable carrier 9 conducts a signal processing operation by means of IC 13 in Step 54. Namely, the portable carrier 9 conducts processing and control of data in accordance with the content of the received signal.

Then, in Step 55, the IC 13 of the portable carrier 9 turns on and off the signal transmitting element 16 as required, so as to deliver a signal indicative of the processing result or data to the terminal device 1 through the signal transmitting/receiving coil 14.

The above-mentioned steps 53 to 55 are repeatedly executed until Step 56 determines that the series of operations is completed. When the completion of operations is determined in Step 56, the process proceeds to Step 57 in which the supply of the AC voltage from the terminal device 1 is ceased so that the operation of the portable carrier 9 is terminated.

The portable carrier 9 consumes electrical power due to, for example, operation of the IC 13. In particular, a large power is consumed when the signal transmitting element 16 is turned on and off to deliver a signal to the terminal device 1 through the coil 14. In this operation, the load current in the power supplying coil 2 of the terminal device 1 is increased so that the voltage across this coil 2 is reduced. This voltage drop is detected by the voltage detector 4 so that the power voltage regulator 5 operates to increase the voltage across the coil 2 so as to compensate for the voltage drop.

Conversely, when the IC 13 and the signal transmitting element 16 of the portable carrier 9 do not operate, loads on the power supplying coil 2 of the terminal device 1 and the power receiving coil 10 of the portable carrier 9 are reduced, whereby the voltage of the smoothing capacitor 12, i.e., the voltage supplied to the IC 13, is elevated. This involves a risk of breakdown of the IC 13 due to application of a voltage exceeding the maximum rated voltage. This problem can be overcome by reducing the voltage across the power supply coil 2 by the operation of the voltage detector 4 and the power voltage regulator 5 in the terminal device 1. Such a measure, however, requires quite a delicate voltage control in the terminal device 1. Moreover, breakdown of the IC 13 due to instantaneous application of an over-voltage is unavoidable due to the delayed response of the voltage detector 4 and the power voltage regulator 5, even when the voltage across the coil 2 is controlled for the purpose of protecting the IC from breakdown.

Thus, the conventional non-contact portable carrier suffers from a problem in that the signal processing means, such as an IC, tends to be damaged due to the application of a high voltage, particularly when the power consumption in the portable carrier is small.

SUMMARY OF THE INVENTION

Accordingly, an object of the present invention is to provide a non-contact portable carrier which can prevent damage to the signal processing means in the carrier even when little power is being consumed.

To this end, according to the present invention, there is provided a non-contact portable carrier, comprising: power receiving means for receiving a power voltage from a terminal device in a non-contact manner; signal processing means connected to the power receiving means and operative for processing a signal; signal transmitting/receiving means connected to the signal processing means and operative for exchanging signals between the terminal device and the signal processing means; and power consuming means sequentially controlled by the signal processing means so as to consume electrical power when the consumption of electrical power by the signal processing means and the signal transmitting/receiving means is small.

In a specific form of the present invention, the non-contact portable carrier has a plurality of the power consuming means having different values of electrical power consumption, which are selectively used under sequential of the processing means in accordance with the states of operation of the signal processing means and the signal transmitting/receiving means.

According to the invention, when the electrical power consumption of the signal processing means and the signal transmitting means is small, electrical power is intentionally consumed by the power consuming means, so as to prevent an abnormal rise of the voltage applied to the signal processing means.

In another specific form of the present invention, the rate of consumption of electrical power by the power consuming means is controlled in accordance with the states of operation of the signal processing means and the signal transmitting/receiving means.

BRIEF DESCRIPTION OF THE DRAWING

FIG. 7 is a flow chart illustrative of operation of the portable carrier shown in FIG. 6.

DESCRIPTION OF THE PREFERRED EMBODIMENTS

Preferred embodiments of the present invention will be described with reference to the accompanying drawings.

Figure 1:
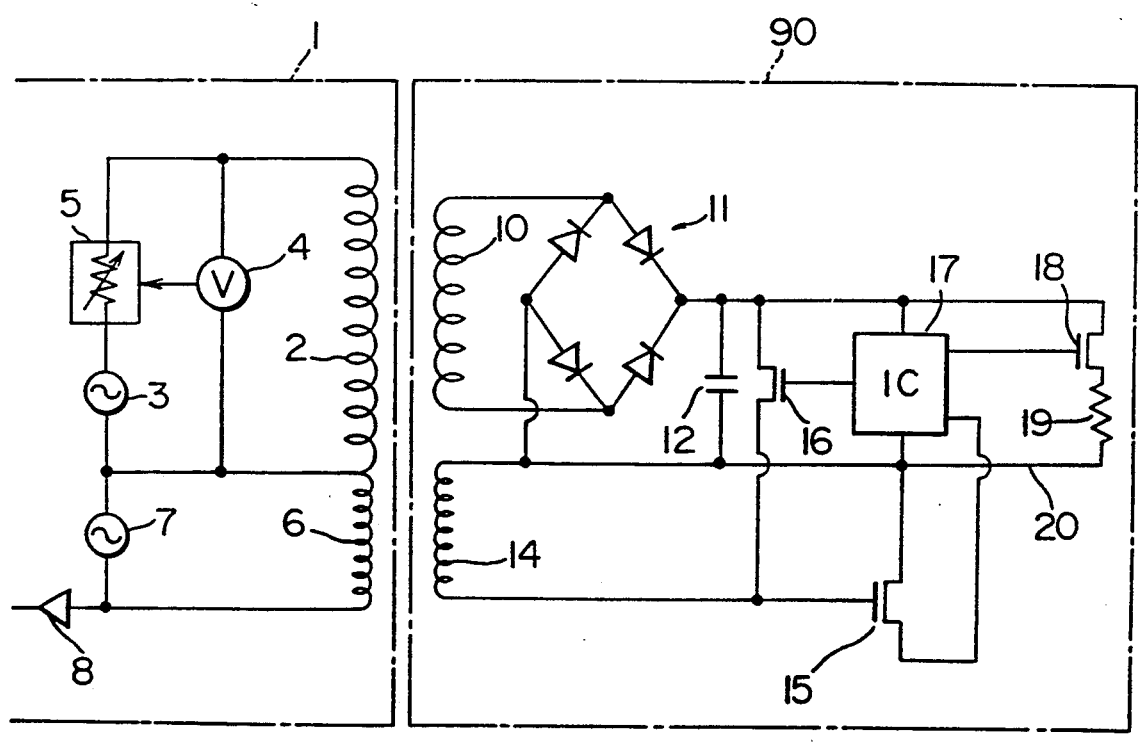
FIG. 1 is a circuit diagram of an embodiment of the non-contact portable carrier in accordance with the present invention.

FIG. 1 is a circuit diagram showing an embodiment of the non-contact portable carrier of the present invention. The non-contact portable carrier 90 has a power receiving coil 10 for receiving AC power from a terminal device 1. A full-wave rectifier circuit 11 is connected to the coil 10. A smoothing capacitor 12 for smoothing pulsating power and an IC 17 for controlling and processing signals are connected to the full-wave rectifier circuit 11. The smoothing capacitor 12 has a high-voltage terminal and a grounding terminal. The IC 17 forms a microcomputer and has a built-in sequence-controllable program. A signal transmitting/receiving coil 14 is connected to the IC 17 through a received signal detecting element 15 and a signal transmitting element 16. A voltage control element 18 is also connected to the IC 17. A resistor 19 is connected between the voltage control element 18 and the ground line 20.

The power receiving coil 10, full-wave rectifier circuit 11 and the capacitor 12 in cooperation form power receiving means, while the IC 17 forms a signal processing means. The signal transmitting/receiving coil 14, received signal detecting element 15 and the signal transmitting element 16 form a signal transmitting/receiving means. The voltage control element 18 and the resistor 19 in combination form a power consuming means.

The portable carrier 90 having the described construction is set on a terminal device 1. The terminal device 1 has a power supplying coil 2 and a signal transmitting/receiving coil 6 which are positioned adjacent the coil 10 and the coil 14 in the portable carrier 90 set on the terminal device 90. A power source 3 and a power voltage regulator 5 are connected to the power supplying coil 2. A voltage detector 4 for detecting the voltage across the power supplying coil 2 is also connected to the coil 2. The output of the voltage detector 4 is connected to the power voltage regulator 5. A signal generator 7 and a received signal detector 8 are connected to the signal transmitting/receiving coil 6.

Figure 2:
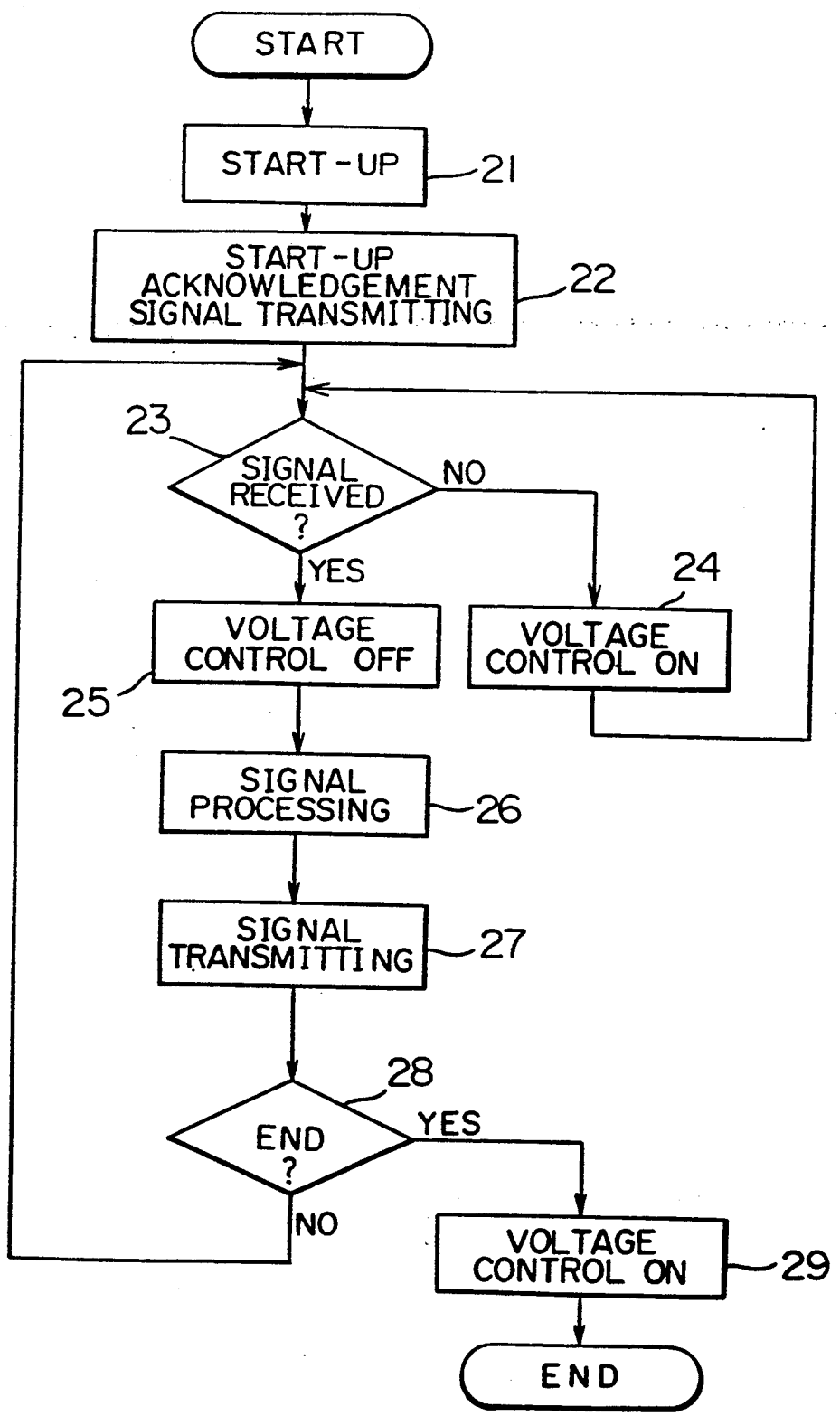
FIG. 2 is a flow chart showing an example of operation of the portable carrier shown in FIG. 1.

The operation of the first embodiment having the described construction will be explained with reference to flow chart shown in FIG. 2.

As the non-contact portable carrier 90 is set on the terminal device 1, the power receiving coil 10 of the portable carrier 90 is brought close to the power supplying coil 2 of the terminal device 1, so that an AC voltage is supplied from the power source 3 to the power receiving coil 10 of the portable carrier 90 through the power supplying coil 2 of the terminal device 1. This AC voltage is rectified into a pulsating DC voltage by the full-wave rectifier circuit 11 and the pulsating DC voltage is smoothed by the smoothing capacitor 12, and the smoothed DC voltage is supplied to the IC 17, whereby the portable carrier 90 is started in Step 21.

In Step 22, the IC 17 of the portable carrier 90 turns the signal transmitting element 16 on and off, so as to transmit a start-up acknowledgment signal indicative of the start-up of the portable carrier 90 to the terminal device 1 through the signal transmitting/receiving coil 14. In this state, the voltage control element 18 is in off state.

The terminal device 1 detects the start-up acknowledgment signal through the signal transmitting/receiving coil 6 and the received signal detecting element 8 and drives the signal generator 7 as required so as to transmit to the portable carrier 90 a signal indicative of the content of processing and data through the coil, 6. In Step 23, the portable carrier 90 determines, through the operation of the coil 14 and the received signal detecting element 15, whether the signal has been received from the terminal device 1. When no receipt of signal is detected, the process proceeds to Step 24 in which the voltage supplied to the IC 17 is controlled. When no signal is received, the portable carrier 90 is in a stand-by condition waiting for receipt, so that it consumes only a very small power which is just enough for enabling the IC 17 to hold the data. In this case, the IC 17 turns the voltage control element 18 on, so that electrical current flows to the ground line 20 through the voltage control element 18 and the resistor 19, thus causing the portable carrier 90 to consume electrical power. As a consequence, an abnormal rise of the voltage applied to the IC 17 is prevented.

Conversely, when receipt of the signal from the terminal device 1 is determined in Step 23, the process proceeds to Step 25 in which the voltage control element 18 is turned off, thereby terminating the control of the voltage supplied to the IC 17, followed by execution of signal processing in Step 26. Namely, processing and control of data are conducted in accordance with the content of the received signal, with normal power consumption.

The process then proceeds to Step 27 in which the IC 17 of the portable carrier 90 turns on and off the signal transmitting element 16 as required, thereby delivering a signal indicative of the processing result or data to the terminal device 1 through the signal transmitting-/receiving coil 14.

Then, whether a series of processing operations has been completed is determined in Step 28. If the operation has not been completed, the process returns to Step 23 to determine whether a signal has been received from the terminal device 1. Thus, when the portable carrier 90 is in the stand-by state waiting for the receipt of a signal, voltage control is executed in Step 24 to cause the portable carrier to consume electrical power, whereas, when a signal is received, the voltage control is ceased in Step 25 and electrical power is consumed for processing and transmission of signals.

The steps 23 to 27 are repeatedly executed until completion of the processing is determined in Step 28. When completion of series of operations is confirmed in Step 28, the voltage control element 18 is turned on in Step 29 as in Step 24, anticipating the reduction of electrical power consumption in the portable carrier 90, whereby the voltage supplied to the IC 17 is controlled. The portable carrier 90 then waits for termination of supply of the AC voltage from the terminal device 1.

Preferably, the resistance value of the resistor 19 enabling the portable carrier 90 to consume power is suitably determined in accordance with the rise of the voltage in the stand-by condition and the maximum rating voltage of the IC 17.

Figure 3:
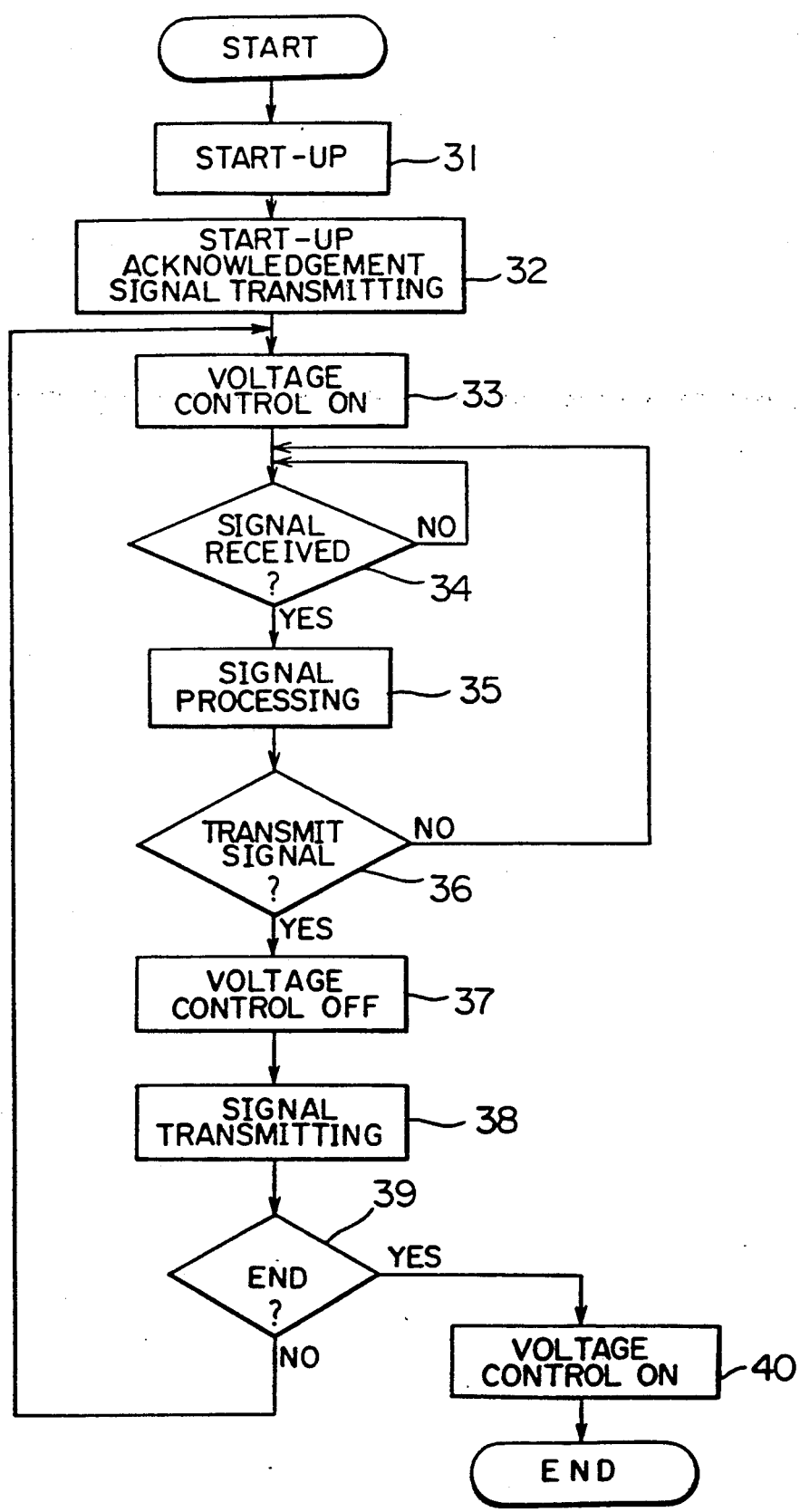
FIG. 3 is a flowchart illustrative of operation of another embodiment of the invention.

FIG. 3 shows a flow chart illustrative of operation of a second embodiment of the present invention.

The electrical power consumption by the portable carrier 90 exhibits a peak when the signal transmitting element 16 is turned on and off so as to supply electrical power to the signal transmitting/receiving coil 14 for the purpose of delivering a signal to the terminal device 1. The second embodiment is therefore constructed such that the voltage supplied to the IC 17 is always controlled to enable the portable carrier 90 to consume power except for the period in which a signal is transmitted to the terminal device 1. Thus, the second embodiment of the portable carrier is distinguished from the first embodiment only by the content of the program stored in the IC 17.

The operation of the second embodiment will be described with reference to a flow chart shown in FIG. 3. As the non-contact portable carrier 90 is set on the terminal device 1, the portable carrier 90 is started in Step 31 and a start-up acknowledgment signal is transmitted from the portable carrier 90 to the terminal device 1 in Step 32, as in the case of the first embodiment. In this state, the voltage controlling element 18 is off.

Then, the voltage controlling element 18 is turned on by the IC 17 in Step 33 so as to enable the portable carrier 90 to consume electrical power, whereby the voltage supplied to the IC 17 is controlled. In Step 34, the portable carrier 90 waits for receipt of a signal from the terminal device 1. If no signal is received, the output of Step 34 is "no" and the step is repeated. When the signal is received, the output is "yes" and the process proceeds to Step 35 in which the IC 17 conducts signal processing.

Then, whether a signal indicative of the processing result or data is to be transmitted to the terminal device 1 is determined in Step 36. When it is determined that no signal is to be transmitted, the process returns to Step 34 in which the portable carrier 90 waits for receipt of a next signal. Conversely, when it is determined that a signal is to be transmitted, the process proceeds to Step 37 in which the voltage controlling element 18 is turned off so as to terminate the control of the voltage supplied to the IC 17. Then, in Step 38 signal transmitting-/receiving element 16 is turned on and off so as to transmit a signal to the terminal device 1 through the signal transmitting/receiving coil 14.

Then, whether a series of processing operation has been completed is determined in Step 39. If the series of operations has not been completed yet, Steps 33 to 39 are executed repeatedly. Conversely, when the operation has been finished, the voltage controlling element 18 is turned on in Step 40 as in Step 33 so as to enable control of the voltage supplied to the IC 17. The portable carrier 90 then waits for termination of the supply of the AC power from the terminal device 1.

The IC 17 and the received signal detecting element 15 consume very little electrical power when operating, particularly when they are constructed from CMOS circuits. The second embodiment, which controls the voltage supplied to the IC 17 to enable the portable carrier 90 to consume power, is specifically effective when the IC 17 and the received signal detecting element 15 are CMOS devices.

Figure 4:
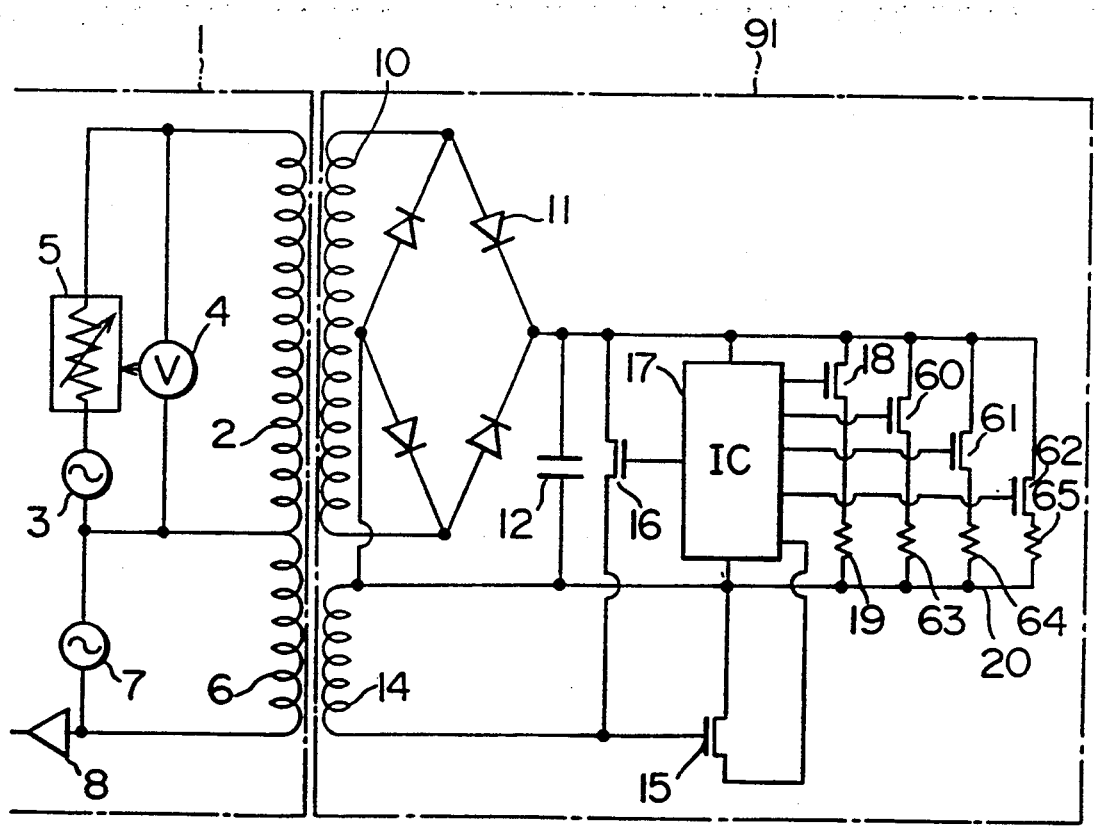
FIG. 4 is a circuit diagram of still another embodiment of non-contact portable carrier in accordance with the present invention.

FIG. 4 is a circuit diagram of a third embodiment of the non-contact portable carrier 91. This embodiment incorporates four power consuming means having different power consuming rates. In addition, the IC 17 as the signal processing means conducts sequential control so as to conduct a change-over of the electrical power consumption rate in accordance with four states of operation of the non-contact portable carrier, e.g., signal transmitting state, signal receiving state, signal processing state and stand-by state. Thus, four circuits each having a voltage controlling element and a resistor are connected to the IC 17 in parallel with one another.

When the portable carrier 91 is in the signal transmitting state, the voltage controlling element 18 is turned on so that electrical current is allowed to flow to the ground line 20 through the resistor 19. When the portable carrier 91 is in the signal receiving state, the voltage controlling element 61 is turned on so that electrical current is allowed to flow to the ground line 20 through the resistor 64. When the portable carrier 91 is in the signal processing state, the voltage controlling element 62 is turned on so that electrical current is allowed to flow to the ground line 20 through the resistor 65. When the portable carrier 91 is in the stand-by state, the voltage controlling element 60 is turned on so that electrical current is allowed to flow to the ground line 20 through the resistor 63. The resistors 19, 63, 64 and 65 have different values of resistance. In general, a system having a signal processing means and signal transmission/receiving means exhibits the smallest power consumption when it is in stand-by state and the power consumption is maximized when the system is in signal transmitting state. It is therefore necessary to select the resistance values of the above-mentioned resistors such that the resistor 60 which is supplied with electrical current when the portable carrier is in the stand-by condition has the smallest resistance value, while the resistor 19 which is supplied with electrical current when the portable carrier 91 is in the signal transmitting state has the greatest resistance value, among the above-mentioned four resistors. Other portions of the third embodiment, as well as the hardware, are materially the same as those shown in FIG. 1, except the content of the program stored in the IC 17.

Figure 5:
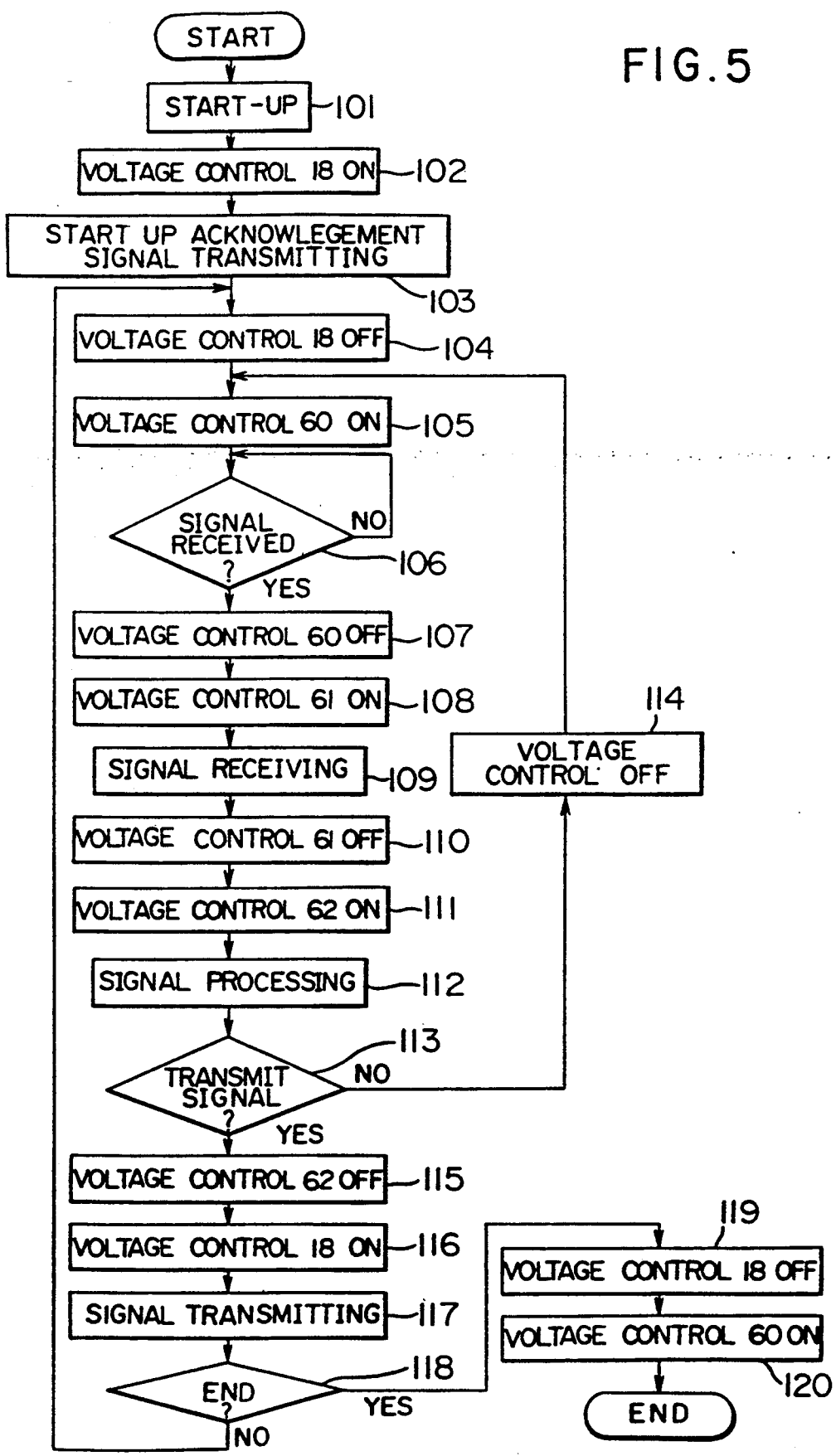
FIG. 5 is a flow chart illustrative of operation of the portable carrier shown in FIG. 4.
Figure 6:
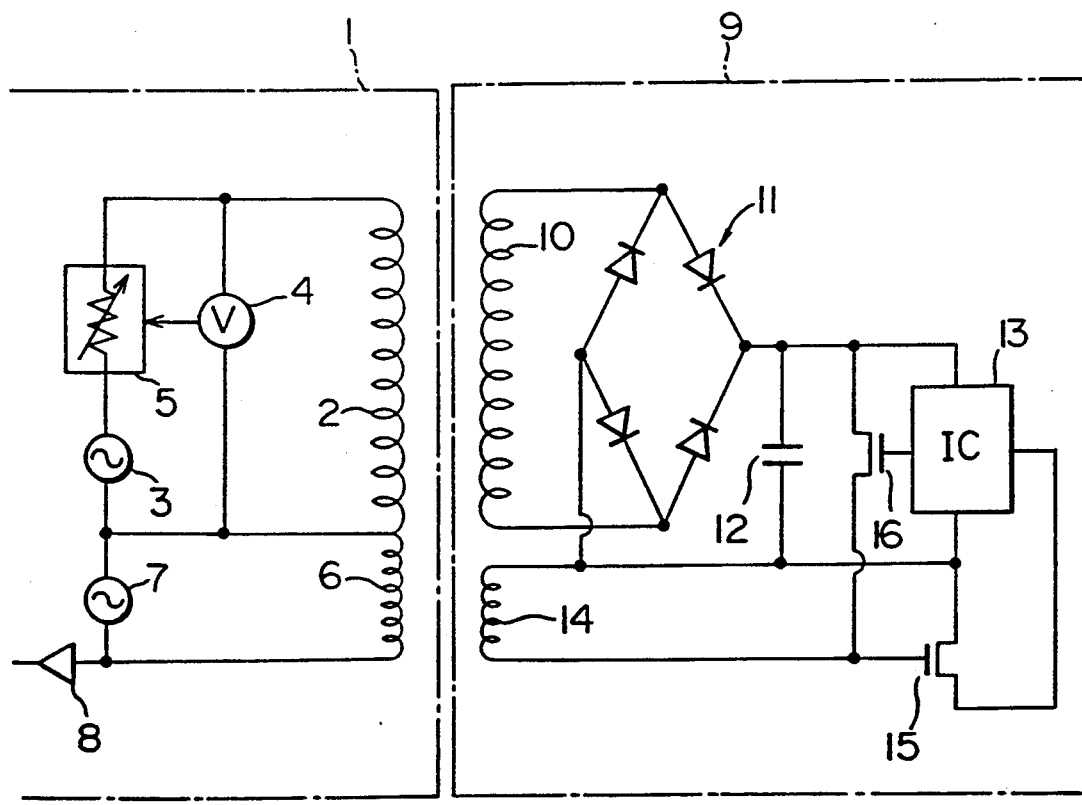
FIG. 6 is a circuit diagram of a conventional non-contact portable carrier.

The operation of the third embodiment will be described with reference to FIG. 5 which is a flow chart illustrative of the operation of this embodiment.

As the non-contact portable carrier 91 is set on the terminal device 1, the portable carrier 91 is started up in Step 101, as in the cases of the first and second embodiments. In this state, all the voltage controlling elements 18, 60, 61 and 62 are off. In Step 102, the voltage controlling element 18, which is used when the portable carrier 91 is in signal transmitting state, is turned on by the IC 17. In Step 103, the IC turns the signal transmitting element 16 on and off so as to deliver a start-up acknowledgment signal indicative of the start-up of the portable carrier 91 to the terminal device 1 through the signal transmitting/receiving coil 14. In this case, electrical current flows to the ground line 20 through the voltage controlling element 18 and the resistor 19 of the greatest resistance value, so as to enable the portable carrier 91 to consume electrical power. The variation of the power voltage supplied to the portable carrier 91 can be made extremely small, provided that the resistance value of the resistor 19 has been selected such that the sum of the power consumed by the portable carrier 91 and the power consumed by turning on and off of the signal transmitting element 16 equals a predetermined value P which is determined taking into account the other states of operation of the portable carrier 91. In this state, other voltage controlling elements 60, 61 and 62 are in the off state.

After completion of transmission of the start up acknowledgment signal, the process proceeds to Step 104 in which the voltage controlling element 18 is turned off, so that the portable carrier 91 is set to the stand-by state. In this state, the power consumption is extremely small, just enough for maintaining electrical current for enabling the IC 17 to hold the data. In this case, therefore, the IC 17 turns on the voltage controlling element 60 for the stand-by state, so that electrical current flows to the ground line 20 through the resistor 63 having the smallest resistance, so that the portable carrier 91 consumes electrical power, thereby preventing an abnormal rise of the voltage supplied to the IC 17. The resistance value of the resistor 63 also is determined such that the sum of the power consumed by the resistor 63 and the power consumed effectively by the portable carrier equals the power P mentioned before.

Then, whether a signal has been received from the terminal device 1 is determined in Step 106. If no signal is received, the output of Step 106 is "no" and the step is repeated. When the receipt of a signal is confirmed, the output of Step 106 is "yes" and the process proceeds to Step 107 in which the voltage controlling element 60 for the stand-by state is turned off, so that the stand-by state is dismissed. In Step 108, the IC 17 turns on the voltage controlling element 61 for the signal-receiving state, so that power is consumed through the resistor 64. The IC then receives a signal in Step 109. In this state, there is an extremely small variation in the voltage of the power supplied to the portable carrier 91, provided that the resistance value of the resistor 64 is determined such that the sum of the power consumed through the voltage controlling element 61 and the resistor 64 and the power consumed by the IC receiving the signal equals to the aforementioned power level P.

After completion of receipt of the signal, the IC turns off the voltage controlling element 61 in Step 110 and, in Step 111, turns on the voltage controlling element 62 for signal processing. Power is therefore consumed through the resistor 65. In Step 112, the IC conducts processing of data in accordance with the content of the received signal. In this state, only a very small variation is caused in the power voltage supplied to the portable carrier 91, provided that the sum of the power consumed by the IC 17 processing the data and the power consumed through the voltage controlling element 62 and the resistor 65 equals to the aforementioned power level P.

Then in Step 113, the IC determines, in accordance with the content of processing of the signal, whether to send the processing result to the terminal device 1 or to wait for a next signal. If it is determined that the portable carrier is to wait for a next signal, the process proceeds to Step 114 in which the IC 17 operates to turn off the voltage controlling element 62 for signal processing. The process then returns to Step 105 in which the IC 17 turns on the voltage controlling element 60 for the stand-by state, so as to prepare for the receipt of the next signal. Conversely, when the IC has determined in Step 113 that the processing result is to be sent to the terminal device, the process proceeds to Step 115 in which the voltage controlling element is turned off. In Step 116, the IC 17 turns on the voltage controlling element 18 for the signal transmitting state, and the signal transmitting element 16 is turned on and off by the IC 17 as required in Step 117, so that a signal indicative of the processing result and the data is transmitted to the terminal device 1 through the signal transmitting-/receiving coil 14. The level of power consumption in this step is the same as that in Step 103.

Then, whether a series of operations has been completed is determined in Step 118. If the operation has not been completed yet, the process returns to Step 104 to prepare for receipt of a signal from the terminal device 1. Thus, Steps 104 to 117 are repeatedly executed until the completion of operation is confirmed in Step 118. When it is judged that the series of operations has been finished, the IC 17, anticipating a reduction in the power consumption, turns off the voltage controlling element 18 for the signal transmitting state in Step 119 and turns on the voltage controlling element 60 for the stand-by state in Step 120, thus setting the portable carrier 91 to the stand-by state as in Step 106. The portable carrier 91 then waits for termination of the supply of the AC voltage from the terminal device 1.

In the embodiments shown in FIGS. 1 and 4, the power consuming means composed of the voltage controlling elements 18, 60, 61, 62 and the resistors 19, 63, 64, 65, as well as the signal transmitting/receiving means composed of the received signal detecting element 15 and the signal transmitting element 16, may be incorporated in the IC 17, rather than being constructed as independent elements. Integration of these means in the IC 17 reduces the number of elements, thus enabling production of the non-contact portable carrier with a reduced production cost.

It is also possible to incorporate the full-wave rectifier circuit 11 in the IC 17.

As will be understood from the foregoing description, the present invention provides a non-contact portable carrier, comprising: power receiving means for receiving a power voltage from a terminal device in a non-contact manner; signal processing means connected to the power receiving means and operative for processing a signal; signal transmitting/receiving means connected to the signal processing means and operative for exchanging between the terminal device and the signal processing means; and power consuming means sequentially controlled by the signal processing means so as to consume electrical power when the consumption of electrical power by the signal processing means and the signal transmitting/receiving means is small.

It is therefore possible to prevent breakdown of the signal processing means such as an IC in the portable carrier which may otherwise be caused by application of a high voltage when the power consumption in the portable carrier is reduced.

What is claimed is:

1. A non-contact IC card comprising:
    power receiving means for receiving power from a terminal device without direct electrical connection to said terminal device;
    signal processing means connected to said power receiving means for processing a signal;
    signal transmitting/receiving means connected to said signal processing means for exchanging signals between said terminal device and said signal processing means; and
    power consuming means sequentially controlled by said signal processing means to consume electrical power when the consumption of electrical power by said signal processing means and said signal transmitting/receiving means is relatively small.

2. A non-contact IC card according to claim 1 wherein:
    said power receiving means includes a power receiving coil for receiving AC power from said terminal device through electromagnetic coupling, a full-wave rectifier circuit for rectifying AC power received by said power receiving coil, and a capacitor for smoothing pulsating output power from said full-wave rectifier circuit, said capacitor having a high-voltage terminal and a grounding terminal;
    said signal processing means includes a microcomputer connected between said high-voltage and grounding terminals of said capacitor for receiving power and including a sequential control program;
    said signal transmitting/receiving means includes a received signal detecting element and a signal transmitting element controlled by said microcomputer and a signal transmitting/receiving coil for exchanging signals with said terminal device through electromagnetic coupling; and
    said power consuming means includes a voltage controlling element controlled by said microcomputer and a resistor, said voltage controlling element and said resistor being connected in series between said high-voltage terminal and said grounding terminal of said capacitor such that electrical current flows to the ground through said resistor when said voltage controlling element has been turned on, thus effecting consumption of electrical power through said resistor.

3. A non-contact IC card according to claim 1 wherein said non-contact IC card has a transmitting state, receiving state, signal processing state, and stand-by state, and said signal processing means sequentially controls said power consuming means to consume electrical power when said non-contact IC card is in said stand-by state.

4. A non-contact IC card according to claim 1 wherein said non-contact IC card has a transmitting state, receiving state, signal processing state, and stand-by state, and said signal processing means sequentially controls said power consuming means to consume electrical power when said non-contact IC card is in said transmitting state.

5. A non-contact IC card according to claim 1 comprising a plurality of said power consuming means having different values of electrical power consumption, said power consuming means being selectively used under sequential control of said processing means in accordance with the states of operation of said signal processing means and said signal transmitting/receiving means.

6. A non-contact IC card according to claim 5 wherein said non-contact IC card has a transmitting state, receiving state, signal processing state, and stand-by state, and said signal processing means maximizes the consumption of electrical power by said power consuming means when said non-contact IC card is in said stand-by state and minimizes the consumption of electrical power by said power consuming means when said non-contact IC card is in said transmitting state.

7. A non-contact IC card according to claim 5 wherein:
    said power receiving means includes a power receiving coil for receiving AC power from said terminal device through electromagnetic coupling without a direct electrical connection, a full-wave rectifier circuit for rectifying AC power received by said power receiving coil, and a capacitor for smoothing pulsating output power from said full-wave rectifier circuit, said capacitor having a high-voltage terminal and a grounding terminal;
    said signal processing means includes a microcomputer connected between said high voltage and grounding terminals of said capacitor for receiving power and including a sequential control program;
    said signal transmitting/receiving means includes a received signal detecting element and a signal transmitting element which are controlled by said microcomputer and a signal transmitting/receiving coil for exchanging signals with said terminal device through electromagnetic coupling; and
    each of said plurality of power consuming means includes a voltage controlling element controlled by said microcomputer and a resistor, each voltage controlling element and each resistor of each power consuming means being connected in series between said high-voltage terminal and said grounding terminal of said capacitor such that electrical current flows to ground through said resistor when said voltage controlling element has been turned on, thus effecting consumption of electrical power through said resistor, said resistors of said different power consuming means having different resistance values, said voltage controlling elements of said plurality of power consuming means being selectively turned on under sequential control of said microcomputer in accordance with the states of operation of said signal processing means and said signal transmitting/receiving means.

8. A non-contact IC card according to claim 7 wherein said non-contact IC card has a transmitting state, receiving state, signal processing state, and stand-by state, and said signal processing means turns on the voltage controlling means connected to the resistor having the greatest resistance value when said non-contact IC card is in said transmitting state.

* * * * *